June 18, 1963   R. H. SHENK   3,094,335
RISING RING SEAL
Filed Oct. 8, 1959

INVENTOR.
ROBERT H. SHENK
BY
*Charles L. Lovercheck*
ATTORNEY

United States Patent Office 3,094,335
Patented June 18, 1963

3,094,335
RISING RING SEAL
Robert H. Shenk, Erie, Pa., assignor to Zurn Industries, Inc., Erie, Pa., a corporation of Pennsylvania
Filed Oct. 8, 1959, Ser. No. 845,192
11 Claims. (Cl. 277—5)

This invention relates to seals and, more particularly, to seals in combination with gear couplings.

Couplings of the type described herein caused difficulty because the lubricant would leak out between the shaft and the coupling. It was difficult to provide a seal that was effective to prevent this leakage.

The seal disclosed in the present invention provides a hydrostatic unbalance in the lubricant within the seal which causes the lubricant to flow toward the inside of the coupling rather than to flow out of the coupling. The seal is so constructed that it also tends to hold the floating ring of the seal toward the sealing surface of the coupling.

It is, accordingly, an object of the present invention to provide an improved seal for a coupling wherein a hydrostatic unbalance in the lubricant inside the coupling holds the sealing members in sealing relation with each other.

Another object of the invention is to provide an improved seal in combination with a gear coupling.

A further object of the invention is to provide a seal for a coupling which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
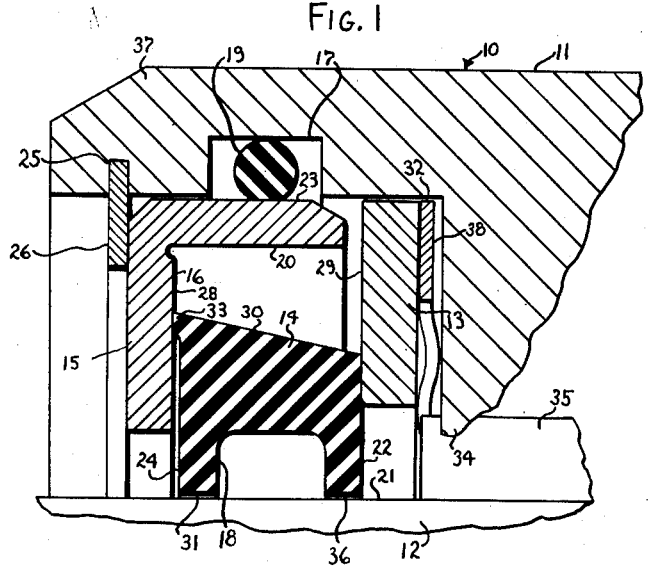
FIG. 1 is a partial longitudinal cross sectional view of a coupling according to the invention.

Now with more specific reference to the drawing, FIG. 1 shows a coupling 10 having a sleeve 11 with internal teeth 34 formed therein. The internal teeth 34 engage external teeth 35 on the hub supported on a shaft 12. A flange 37 extends outwardly on the sleeve 11 from the internal teeth 34 and defines an inner peripheral surface 32 which has an O-ring groove 17 formed therein. The O-ring groove 17 receives an O-shaped washer 19 which is preferably made of resilient rubber like material. The washer 19 rests on an outer peripheral surface 23 of a retainer 15.

A floating washer 13 is an annular flat washer. There is a clearance of approximately ten-thousandths of an inch between the outside peripheral surface of the washer 13 and the inner peripheral surface 32 of the flange 37. The washer 13 also has a hole therethrough which is substantially larger than an outer peripheral surface 21 of the shaft 12. Therefore, the washer 13 floats inside the flange 37.

An outer surface 29 of the floating washer 13 engages a side surface 22 of a washer 14. A wavy washer 38 engages the washer 13 and urges the washer 13 into engagement with the washer 14. The washer 14 is made of rubber like material and has an inner peripheral groove 18 with inwardly extending peripheral surfaces 31 and 36 which sealingly engage the outer peripheral surface 21 of the shaft 12. An end surface 24 of the washer 14 is relieved so that an annular flange surface 33 extends outwardly therefrom and the surface 33 sealingly engages an inner retainer surface 28 of the retainer 15.

The surface 28 forms one side of an inner peripheral groove 16 in the retainer 15 and a surface 20 forms the other inner surface of the groove 16 in the retainer 15. A snap ring 26 is received in a groove 25 formed in the outwardly extending end of the flange 37 and the snap ring 26 holds the retainer 15 against sliding movement outwardly.

An outer peripheral surface 30 of the washer 14 is inclined inwardly toward the internal teeth 34 and toward the shaft 12 so that the outer diameter of the washer 14 is less adjacent the hub teeth than the diameter at the outer end thereof.

Figure 2:
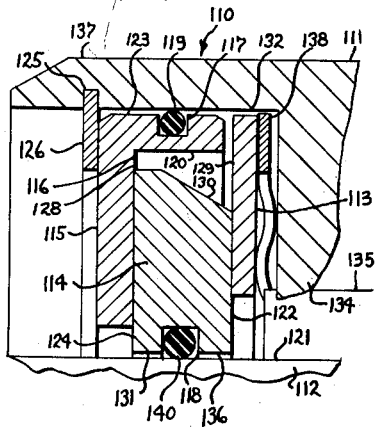
FIG. 2 is a view of another embodiment of the invention.

In the embodiment of the invention shown in FIG. 2, a coupling 110 is shown having a sleeve 111 with internal peripheral teeth 134 formed therein. The internal teeth 134 engage external teeth 135 on a hub 112. A flange 137 extends outwardly on the sleeve 111 from the internal teeth 134 and defines an inner peripheral surface 132 which engages an O-ring 119.

The O-ring 119 is received in an O-ring groove 117 in an outer peripheral surface 123 of a retainer 115. The O-ring 119 is preferably made of resilient material such as rubber or the like and it rests on the inner peripheral surface 132 of the flange 137. A floating washer 113 has a hole therethrough which receives the hub or shaft 112 and the hole in the washer 113 is substantially larger than an outer peripheral surface 121 of the shaft 112. Therefore, the washer 113 floats inside the flange 137.

An outer surface 129 of the floating washer 113 engages a side surface 122 of a washer 114. The washer 114 may be made of any suitable material and has an inner peripheral groove 118 which receives an O-ring 140. The groove 118 is between inwardly extending peripheral shoulders 131 and 136 which are disposed on either side thereof. The surfaces on each side of the O-ring 140 hold it in place in the groove 118 to form sealing engagement with the outer peripheral surface 121 of the shaft 112. An outer end surface 124 of the washer 114 engages an inner surface 128 of the retainer 115. The surface 128 forms one side of the inner peripheral groove in the retainer 115 and a surface 120 forms the other surface of a groove 116 in the retainer 115.

A snap ring 126 is received in a groove 125 in the flange 137 and it forms on the outer extending end of the flange 137. The snap ring 126 holds the retainer 115 against sliding movement outwardly.

An outer peripheral surface 130 of the washer 114 is inclined inwardly and toward the internal teeth 134 and toward the shaft 112 so that the outer diameter of the washer 114 is less than that adjacent the hub teeth. Therefore, the centrifugal force on grease at the outer edge of the washer 114 as the shaft 112 rotates will be greater than that on the inner edge because of the greater diameter of the washer 112 and, therefore, the grease will be urged toward the coupling 110. Also, the inner diameter of the retainer 115 is less than the inner diameter of the washer 113 so that the centrifugal force acts in like manner. A wavy washer 138 engages the washer 113 and urges it into engagement with the washer 114.

Figure 3:
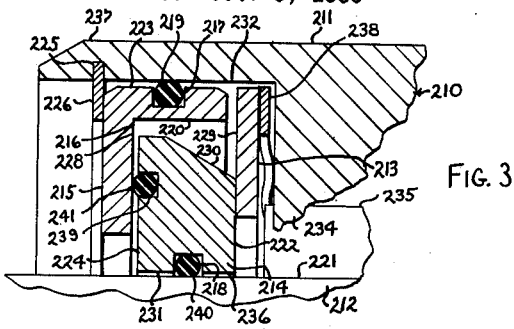
FIG. 3 is a view of still another embodiment of the invention.

In the embodiment of the invention shown in FIG. 3, a coupling 210 has a sleeve 211 with internal teeth 234 formed therein. The internal teeth 234 engage external teeth 235 on the hub supported on a shaft 212. A flange 237 extends outwardly on the sleeve 211 from the internal teeth 234 and defines an internal peripheral surface 232. The surface 232 engages an O-ring 219 which is supported in an O-ring groove 217 in an outer peripheral surface 223 of a retainer 215. The O-ring groove 217 receives the O-ring 219 which is preferably made of resilient material and the O-ring 219 rests on the inner peripheral surface 232 of the flange 237.

A floating washer 213 is an annular flat washer and has a clearance of approximately ten thousandths of an inch between the outside peripheral surface thereof and the inner peripheral surface 232 of the flange 237. The washer 213 also has a hole therethrough which is substantially larger than an outer peripheral surface 221 of the shaft 212 and, also, larger than the inner peripheral surface of the retainer 215. Therefore, the washer 213 floats inside the flange 237.

An outer surface 229 of the floating washer 213 engages a side surface 222 of a washer 214. The washer 214 is made of rubber like material and has an inner peripheral groove 218 with inwardly extending peripheral surfaces 231 and 236 on either side of the groove 218. The surfaces 231 and 236 receive an O-ring 240 and are disposed in slightly spaced relation from the external periphery of the shaft 212.

An outer surface 224 of the washer 214 has a groove 239 which receives an O-ring 241. The O-ring 241 rests against a surface 228 of the retainer 215 and forms a sealing engagement thereon. The surface 228 forms one side of the inner peripheral groove in the retainer 215. A surface 220 forms the other inner surface of a groove 216 in the retainer 215. A snap ring 226 is received in a groove 225 formed in the outwardly extending end of the flange 237 and the snap ring 226 holds the retainer 215 against outwardly sliding movement.

An outer peripheral surface 230 of the washer 214 is inclined inwardly toward the internal teeth 234 and toward the shaft 212 so that the outer diameter of the washer 214 is less adjacent the hub teeth than the diameter at the outer end thereof. In other words, the washer 214 is generally shaped as the frustum of a cone.

A spiral spring washer 238 is made of a piece of flat material and it urges the washer 213 into engagement with the surface 222 of the washer 214.

Figure 4:
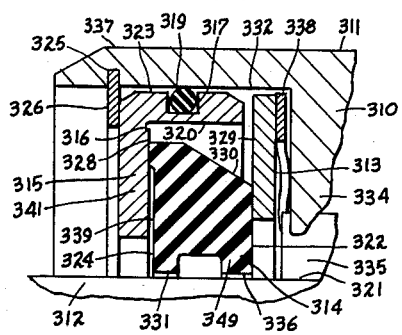
FIG. 4 is a view of still another embodiment of the invention.

In the embodiment of the invention shown in FIG. 4, a coupling 310 is shown having a sleeve 311 with internal teeth 334 formed therein. The internal teeth 334 engage external teeth 335 on the hub supported on shaft 312. A flange 337 extends outwardly on the sleeve 311 from the internal teeth 334 and defines an internal peripheral surface 332. The surface 332 engages an O-ring 319 which is supported in an O-ring groove 317 in an outer peripheral surface 323 of a retainer ring 315. The O-ring groove 317 receives the O-ring 319 which is preferably made of resilient material and the O-ring 319 rests on the inner peripheral surface 332 of the flange 337.

A floating washer 313 is an annular flat washer and has a clearance of approximately ten thousandths of an inch between the outside peripheral surface thereof and the inner peripheral surface 332 of the flange 337. The washer 313 also has a hole therethrough which is substantially larger than the outer peripheral surface 321 of the shaft 312 and, also, larger than the inner peripheral surface of the retainer ring 315. Therefore, the washer 313 floats inside the flange 337.

The outer surface 329 of the floating washer 313 has a side surface 322 of a resilient washer 314. The resilient washer 314 is made of rubber like material and has an inner peripheral groove 318 which defines inwardly extending legs 331 and 349. The legs 331 and 336 sealingly engage the shaft 312.

An outer surface 324 of the retainer ring 315 has a peripheral groove which receives the O-ring. The O-ring 319 in the peripheral groove rests against the inside peripheral surface of the sleeve 311 and forms sealing engagement thereon. A surface 328 forms one side of the inner peripheral groove of the retainer ring 315. A surface 320 forms the inner surface of a groove 316 in the retainer ring 315. A snap ring 326 is received in a groove 325 formed in the outwardly extending edge of the flange 327 and the snap ring 326 holds the retainer ring 315 against outward sliding movement.

An outer peripheral surface 330 of the washer 314 is inclined inwardly toward the internal teeth 334 and toward the shaft 312 so that the outer diameter of the washer 314 is less adjacent the hub teeth than the diameter at the outer end thereof. In other words, the washer 314 is generally shaped as the frustum of a cone.

A spiral spring washer is made of a piece of flat material and it urges the washer 313 into engagement with the surface 322 of the washer 314.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a hub and sleeve type gear coupling comprising an externally toothed hub and an internally toothed sleeve, the flange on said sleeve extending outwardly and overlying said hub, a flat washer inside said flange and having a diameter slightly smaller than the internal diameter of said flange, a retainer being L-shaped in cross section having an outer peripheral surface, an O-shaped sealing washer engaging said outer surface of said retainer, a groove in the internal surface of said flange receiving said O-shaped washer, snap rings disposed in a groove in said flange and engaging the outer surface of said retainer, holding said retainer against outward movement, and a resilient washer having an internal groove with the internal surface of said resilient washer on each side of said groove engaging the outer peripheral surface of said hub, said resilient washer being frusto-conical in shape and of lesser outer diameter adjacent said teeth than at the edge remote from said teeth, and the outer surface of said washer engaging the lateral surface of said retainer.

2. A seal for a shaft having a sleeve supported around said shaft comprising a flat washer having an outer diameter of slightly less than the internal diameter of said sleeve, a retainer in said sleeve spaced from said washer and having an outer surface substantially equal to the internal diameter of said sleeve, snap rings in grooves in said sleeve holding said retainer in position, an O-ring groove in a flange on said sleeve, an O-ring in said O-ring groove disposed against the outer peripheral surface of said retainer, a resilient washer having a tapered outer surface tapering inwardly and toward a flat washer, an internal groove in said resilient washer, said resilient washer engaging said shaft on either side of said internal groove, said flat washer engaging said resilient washer on the side thereof remote from said retainer.

3. A seal for a coupling between a shaft and a sleeve comprising a shaft, a resilient washer having an internal groove therein, said resilient washer being disposed on said shaft and sealingly engaging said shaft on both sides of said groove and having a tapered outer surface tapering inward and toward said sleeve, a retainer ring L-shaped in cross section disposed around said shaft, said resilient washer being disposed in said retainer ring with one part of said L-shaped ring engaging an edge of said retainer ring and the other part of said L-shaped retainer ring overlying said resilient washer, means engaging said retainer ring to limit its axial movement in said sleeve, sealing means engaging the outside periphery of said retainer ring, and a flat washer disposed on said shaft and engaging the side of said resilient washer remote from said retainer ring, said flat washer having an internal diameter substantially larger than the outside diameter of said shaft and an outside diameter substantially smaller than the inside diameter of said sleeve, the edge of said resilient washer inwardly from the outer periphery thereof being out of engagement with said retainer ring.

4. The seal recited in claim 3 wherein said sealing means engaging the outside periphery of said retainer ring comprises an O-ring.

5. The seal recited in claim 3 wherein said sealing means engaging the outside of said retaining ring comprises an O-ring disposed in an internal groove formed in a flange in said sleeve.

6. The seal recited in claim 3 wherein said sealing means engaging the outside periphery of said retaining ring comprises an O-ring disposed in an external groove in said L-shaped retainer ring.

7. The seal recited in claim 3 wherein said means engaging said retainer ring comprises a snap ring disposed in an internal groove in said sleeve and engaging said retainer ring.

8. The seal recited in claim 7 wherein said sealing means engaging the outer periphery of said retainer ring comprises an O-ring.

9. A coupling comprising a shaft and a sleeve having a driving connection therebetween, a frusto-conical shaped washer on said shaft in said sleeve with its minor diameter adjacent said sleeve, a retaining washer engaging one side of said frusto-conical shaped washer, a floating washer on said shaft engaging the small end of said retaining washer whereby lubricant is forced from said retaining washer toward said floating washer by centrifugal force.

10. The coupling recited in claim 9 wherein said retaining washer has a smaller hole than said floating washer.

11. A seal for a coupling between a shaft and a sleeve comprising a shaft, a sleeve disposed concentric to said shaft, means to connect said shaft to said sleeve to transmit torque from one to the other, frusto-conical shaped resilient washer on said shaft having an inner peripheral surface sealingly engaging said shaft with its minor diameter adjacent said sleeve, an annular retainer on said shaft, the outer end edge of the base of said frusto-conical washer sealingly engaging said retainer, and a washer on said shaft fitting loosely into said sleeve and sealingly engaging the inner end surface of said frusto-conical washer.

References Cited in the file of this patent
UNITED STATES PATENTS

| | | |
|---|---|---|
| 1,769,975 | Szekely | July 8, 1930 |
| 1,891,285 | Loewus | Dec. 20, 1932 |
| 2,836,443 | Farmer | May 27, 1958 |